: 2,930,758
Patented Mar. 29, 1960

2,930,758
ESTER-BASE LUBRICANT CONTAINING ANTI-OXIDANT MIXTURES

Raymond B. Tierney, Wappingers Falls, Robert H. Krug, Cornwall, and Ralph P. Chesluk, Wappingers Falls, N.Y., assignors to Texaco Inc., a corporation of Delaware No Drawing. Application September 28, 1956
Serial No. 612,584

3 Claims. (Cl. 252—46.7)

This invention relates to a lubricant composition containing a superior antioxidant combination. More particularly, the present invention relates to an antioxidant additive combination for ester-base lubricant compositions having excellent effect at extremely high lubricating temperatures.

One of the greatest problems in lubricating at high temperatures is to develop a composition which will not easily oxidize to form acidic components which in turn create harmful deposits or sludges in the composition. This problem is especially difficult to overcome when dealing with the extremely high temperatures encountered in modern aircraft gas turbine engines and hydraulic systems where hot areas in the range of from 500 to 750° F. are contacted by the lubricant.

In accordance with the present invention, a very superior high temperature lubricant composition is provided comprising an ester-type base fluid and from 0.1 to 4 percent of an antioxidant combination consisting of from 40 to 60 percent by weight of phenothiazine or derivatives thereof and a remainder of an aromatic primary, secondary, or tertiary amine or mixtures thereof having antioxidant properties.

A preferred lubricant composition having outstanding anti-oxidant properties at high lubricating temperatures comprises an ester type base fluid, 0.1 to 4.0 weight percent of an anti-oxidant combination composed of 40–60% of phenothiazine or a derivative thereof, and an additional component which is a mixture of an aryl-substituted naphthylamine, an aryl-substituted phenylenediamine and an alkoxy-substituted diphenylamine.

Phenothiazine which has the formula:

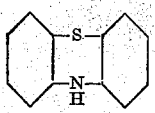

is a known effective antioxidant. Substituted derivatives thereof are also included within the scope of this invention. These derivatives are usually formed, for example, by the substitution of alkyl, aryl, amino, amido, and nitro groups for the hydrogen atoms on the aryl or nitrogen portion of the molecule.

The aromatic amines having antioxidant properties in accordance with the invention include naphthylamine and substituted derivatives thereof, phenylene diamine and substituted derivatives therof, and diphenylamine and substituted derivatives thereof. Examples of these compounds are as follows:

Alpha-naphthylamine
Beta-naphthylamine
N-phenyl-beta-naphthylamine
Alpha,alpha-dinaphthylamine
Alpha,beta-dinaphthylamine
o-Phenylene diamine
m-Phenylene diamine
p-Phenylene diamine
N-phenyl-o-phenylene diamine
N,N'-diphenyl-p-phenylene diamine
N,N'-ditolyl-p-phenylene diamine
N,N'-dinaphthyl-m-phenylene diamine
N-dimethyl-p-phenylene diamine
N-dimethyl-N'-diisobutyl-p-phenylene diamine
N,N'-tetramethyl-m-phenylene diamine
N,N'-diisoamyl-p-phenylene diamine
Benzidine
m-Tolylene diamine
Diphenylamine
p-Isopropoxydiphenylamine
Di-p-methoxydiphenylamine
2,4'-diaminodiphenylamine The above named compounds are used alone or in mixtures with each other in accordance with the invention. Some examples of mixtures of these compounds which are useful are as follows:

Composition I:                           Mixture, wt. percent
  α-Naphthylamine _____ 75
  m-Phenylene diamine _____ 15
  Diphenylamine _____ 10

Composition II:
  N-phenyl-β-naphthylamine _____ 50
  N,N'-diphenyl-p-phenylene diamine _____ 25
  p-Isopropoxydiphenylamine _____ 25

Composition III:
  α,β-Dinaphthylamine _____ 60
  Benzidine _____ 20
  2,4'-diaminodiphenylamine _____ 20

Composition IV:
  N-phenyl-β-naphthylamine _____ 60
  Di-p-methoxydiphenylamine _____ 40

Composition V:
  N-phenyl-o-phenylene diamine _____ 50
  p-Isopropoxydiphenylamine _____ 50

The preferred mixture in accordance with this invention is composition II, based on availability, and the preferred antioxidant combination is about 50 percent phenothiazine with 50 percent of the above-mentioned composition II.

The ester-base fluids useful in accordance with this invention are broadly described as the aliphatic diesters of organic dicarboxylic acids and the aliphatic diesters of dimer acids formed from ethylenic moncarboxylic acids.

The dicarboxylic acid component is usually an aliphatic dicarboxylic acid containing 6 to 12 carbon atoms but glutaric and succinic acid esters are also useful. From the standpoint of cost and availability, the preferred dibasic acids are adipic acid, sebacic acid, and azelaic acid.

When dimer acid esters are utilized as base fluids, the dimer acid components are usually formed from polyethylenic monocarboxylic acids having from 12 to 22 carbon atoms. The dimer acid components may also be the conjugation products of one molecule of a monoethylenic acid and one molecule of a polyethylenic acid. For example, the dimerization product of oleic acid and linoleic acid is a suitable dimer acid component. One polyethylenic monocarboxylic acid molecule is necessary, however, in forming the dimer. The preferred acid is linoleic which is polymerized to the dimer stage to form a dicarboxylic acid. Lubricant compositions based on the dialkyl esters of dimer acids are novel and set forth in copending application Serial No. 612,583, Raymond B. Tierney and Ralph P. Chesluk, filed September 28, 1956. These esters of dimer acids are thermally stable at temperatures in the vicinity of 750° F. and are the preferred base fluids of this invention.

The aliphatic alcohols used to form the diesters may contain from 1 to 30 carbon atoms. $C_4$ to $C_{18}$ alcohols are most commonly used. Ether alcohols, such as Cellosolve and Carbitol, may also be used in the formation of the aliphatic diesters. In lubricating compositions which are to be subjected to prolonged heat of over 500° F., it is desirable to use primary aliphatic alcohol components in forming the diester base fluids of the invention.

Some examples of the dialkyl esters of aliphatic dicarboxylic acids useful as lubricant bases in this invention are as follows: diisooctyl adipate, di-2-ethylhexyl adipate, di-2-ethylhexyl azelate, di-2-ethylhexyl sebacate, dilauryl azelate, and dihexadecyl sebacate. Examples of the dialkyl esters of dimer acids useful as lubricant bases in this invention are as follows: dimethyl dilinoleate, diethyl dilinoleate, dibutyl dilinoleate, di-2-ethylhexyl dilinoleate, didecyl dilinolenate, and the dibutyl ester of a dimer of oleic and linoleic acids. Of the above esters, dibutyl dilinoleate is preferred on the basis of availability and performance at high temperatures.

The above discussion of the more preferred and more common ester-type lubricating bases does not preclude from the scope of the invention other ester-type bases, for example, the polyester compounds formed by the reaction of an aliphatic dicarboxylic acid, a glycol and a monofunctional compound as set forth in U.S. 2,628,974 to Robert T. Sanderson, issued February 17, 1953. Polyesters formed by reaction of a monocarboxylic acid and a glycol, and sulfur analogs of all the above-described esters are also useful as bases in the formulation of the lubricating compositions of the invention.

Other additives useful in improving certain characteristics of the lubricant are also included in these compositions. Extreme pressure agents and anti-wear agents are particularly useful. One such compound which is an excellent E.P. and anti-wear agent is a neutralized (2,2'-dichlorodiphenyl)phenyl phosphate or di(o-chlorophenyl)phenyl phosphate having the following formula:

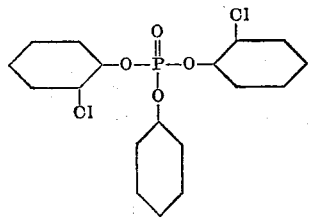

This compound is usually added in amounts ranging from 1 to 5 weight percent of the composition. Viscosity index and pour point improver, detergents, anti-rust, and anti-foam agents are examples of other additives which can be included in the composition if desired.

The anti-oxidant combination of the present invention was tested using the procedure for the panel coking test described in the requirements of MIL-L-9236 military specification. Briefly, the test can be described as operating in the following manner: The test fluid, in a gravity filled reservoir, is splashed onto an overhead aluminum panel by means of a rotating wire brush. This panel is maintained at the test temperature by means of a conventional automatic temperature control unit. The aluminum panel is carefully cleaned and weighed at the start of the test and reweighed after the test run. The weight of deposited coke is thereby determined.

The anti-oxidant properties of the combination of the invention as determined by its ability to reduce the coking tendencies of a lubricant blend in the foregoing panel coking test is demonstrated in the following table. The base fluid used in the test was the dibutyl ester of the dimer of linoleic acid or dibutyl dilinoleate.

TABLE I
*Panel coking test*

| Run | Additive | Conc. (wt.), percent | Panel Temp., °F. | Coke (mg.) |
|---|---|---|---|---|
| 1 | Phenothiazine | 0.5 | 750 | 459 |
| 2 | do | 1.0 | 750 | 261 |
| 3 | Aromatic amines [1] | 0.5 | 750 | 400 |
| 4 | Phenothiazine / di(o-chlorophenyl) phenyl phosphate | 0.5 / 2.0 | 750 | 377 |
| 5 | Aromatic amines [1] / di(o-chlorophenyl) phenyl phosphate | 0.5 / 2.0 | 750 | 382 |
| 6 | Phenothiazine / aromatic amines [1] / di(o-chlorophenyl) phenyl phosphate | 0.5 / 0.5 / 2.0 | 750 | 188 |
| 7 | Phenothiazine / aromatic amines / di(o-chlorophenyl) phenyl phosphate / antifoam agent [2] | 0.5 / 0.5 / 2.0 / 150 p.p.m. | 750 | 153 |

[1] The aromatic amines were a mixture of 50 percent N-phenyl-β-naphthylamine, 25 percent N,N'-diphenyl-p-phenylene diamine and 25 percent p-isopropoxydiphenylamine.
[2] 10 percent dimethyl silicone in kerosine.

The above Table I demonstrates the superior anti-oxidant properties of the lubricant of the invention at the high temperature of 750° F. Phenothiazine alone in runs 1, 2, and 4 although lending anti-oxidant properties to the base fluid does not compare with the combination of the invention as shown in runs 6 and 7. The aromatic amines which are known anti-oxidants and which are shown to lend anti-oxidant properties to the base fluid in runs 3 and 5 are definitely inferior to the phenothiazine-aromatic amine combination of the invention at 750° F. Synergism is definitely shown to exist between phenothiazine and the aromatic amines. Runs 4 and 5 demonstrate that the E.P.-antiwear additive di(o-chlorophenyl)phenyl phosphate has no appreciable anti-oxidant effect on the base lubricant in combination with either phenothiazine or the aromatic amines.

To further demonstrate the superiority of the combination of the invention in imparting anti-oxidant properties to an ester-type base fluid, the results of pressurized bomb tests on the combination and the individual components thereof are set forth in the following table. This test attempts to simulate conditions which are similar but more severe than actual conditions encountered by fluids in hydraulic systems. The bomb test consisted of placing the test fluid in a stainless steel pressure reactor, pressurizing with nitrogen to 3000 p.s.i. while the temperature of the reactor was maintained at 700° F. The reactor was mildly agitated during a two hour period by a rocker mechanism. The base fluid used in the following tests was dibutyl dilinoleate.

TABLE II
*Pressurized bomb test results*

| Run | Additive | Conc. (wt.), percent | Vis. 210° F. (cs.) Before | Vis. 210° F. (cs.) After |
|---|---|---|---|---|
| 1 | None | | 11.32 | 13.49 |
| 2 | Phenothiazine | 0.5 | 11.33 | 14.62 |
| 3 | Phenothiazine / di(o-chlorophenyl) phenyl phosphate | 0.5 / 2.0 | 12.42 | 10.73 |
| 4 | Aromatic amines [1] / di(o-chlorophenyl) phenyl phosphate | 0.5 / 2.0 | 12.36 | 10.05 |
| 5 | Phenothiazine / aromatic amines [1] / di(o-chlorophenyl) phenyl phosphate | 0.5 / 0.5 / 2.0 | 12.36 | 12.49 |

[1] The aromatic amines consisted of a mixture of 50 percent N-phenyl-β-naphthylamine, 25 percent N,N'-diphenyl-p-phenylene diamine and 25 percent p-isopropoxydiphenylamine.

It can be seen from the above Table II that the base fluid tends to increase in viscosity under the test conditions, which usually signifies a change in chemical composition, and phenothiazine alone does not appear to stabilize the base fluid. The di(o-chlorophenyl)phenyl phosphate, which is present as an E.P. and anti-wear agent causes the base fluid to lose viscosity and neither the phenothiazine alone nor the aromatic amines alone stabilize the composition. The combination additive of the invention as shown in test run 5 effectively stabilizes the viscosity of the composition after its having been exposed to the severe conditions of the test.

Obviously, many modifications and variations of the invention, as hereinbefore set forth, may be made without departing from the spirit and scope thereof, and, therefore, only such limitations should be imposed as indicated in the appended claims.

We claim:

1. A lubricating oil composition having improved anti-oxidant properties at high lubricating temperatures consisting of an alkyl $C_1$–$C_{10}$ diester of the dimer of linoleic acid as the base fluid, from 0.5 to 2% by weight of an anti-oxidant combination composed of from 40 to 60% phenothiazine and from 60 to 40% of a mixture of about two parts N-phenyl-beta-naphthylamine, one part N,N'-diphenyl-p-phenylene diamine, and one part p-isopropoxy diphenylamine, and from 1 to 5 weight percent of di(o-chlorophenyl) phenyl phosphate.

2. The lubricating oil of claim 1 wherein the base fluid is the dibutyl ester of the dimer of linoleic acid.

3. A lubricating oil composition having improved antioxidant properties at high lubricating temperatures consisting of the dibutyl ester of the dimer of linoleic acid as the base fluid, from 0.5 to 2% by weight of an antioxidant combination composed of about 50% phenothiazine and about 50% of a mixture of about 2 parts N-phenyl-beta-naphthylamine, one part N,N'-diphenyl-p-phenylene diamine, and one part p-isopropoxy diphenylamine, about 2% by weight of di(o-chlorophenyl) phenyl phosphate, and a foam inhibiting amount of 10% dimethyl silicone in a kerosene carrier.

References Cited in the file of this patent

UNITED STATES PATENTS

| | | |
|---|---|---|
| 2,375,007 | Larsen | May 1, 1945 |
| 2,529,190 | Rocchini | Nov. 7, 1950 |
| 2,609,343 | Saunders | Sept. 2, 1952 |
| 2,673,184 | Morway | Mar. 23, 1954 |
| 2,722,518 | Watson | Nov. 1, 1955 |
| 2,815,327 | Mehr et al. | Dec. 3, 1957 |

OTHER REFERENCES

Murphy et al.: "Mode of Action of Phenothiazine-Type Antioxidants," Ind. and Eng. Chem., vol. 42, No. 12, 1950, pp. 2479–2489.

"Synthetic Lubricants," WADC Technical Report 53–88, October 1953.